United States Patent
Devadhar

(10) Patent No.: US 9,229,793 B2
(45) Date of Patent: Jan. 5, 2016

(54) SYSTEM, METHOD AND COMPUTER PROGRAM PRODUCT FOR ROUTING MESSAGES TO A SERVER

(75) Inventor: Vijayanth Devadhar, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 340 days.

(21) Appl. No.: 13/092,710

(22) Filed: Apr. 22, 2011

(65) Prior Publication Data

US 2011/0264765 A1   Oct. 27, 2011

Related U.S. Application Data

(60) Provisional application No. 61/327,036, filed on Apr. 22, 2010.

(51) Int. Cl.
*G06F 15/16* (2006.01)
*G06F 9/54* (2006.01)
*H04L 29/08* (2006.01)
*H04L 12/861* (2013.01)

(52) U.S. Cl.
CPC .............. *G06F 9/546* (2013.01); *H04L 67/148* (2013.01); *H04L 49/90* (2013.01)

(58) Field of Classification Search
CPC ....... G06F 9/546; H04L 49/90; H04L 67/148; H04L 51/00; H04L 51/22; H04L 51/36; H04L 51/06; H04L 51/063; H04L 51/066
USPC ......... 709/212, 213, 214, 215, 216, 217, 218, 709/219
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |

(Continued)

OTHER PUBLICATIONS

U.S. Appl. No. 60/828,192, filed Oct. 4, 2006.

*Primary Examiner* — Dhairya A Patel
(74) *Attorney, Agent, or Firm* — Zilka-Kotab, PC

(57) ABSTRACT

In accordance with embodiments, there are provided mechanisms and methods for routing messages to a server. These mechanisms and methods for routing messages to a server can enable dynamic data migration within a system, increased efficiency, improved user experience, avoidance of data loss, etc.

19 Claims, 4 Drawing Sheets

(56) References Cited

U.S. PATENT DOCUMENTS

| | | | |
|---|---|---|---|
| 6,324,693 | B1 | 11/2001 | Brodersen et al. |
| 6,336,137 | B1 | 1/2002 | Lee et al. |
| D454,139 | S | 3/2002 | Feldcamp |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker et al. |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,062,502 | B1 | 6/2006 | Kesler |
| 7,069,231 | B1 | 6/2006 | Cinarkaya et al. |
| 7,181,758 | B1 | 2/2007 | Chan |
| 7,209,929 | B2 | 4/2007 | Dominguez, Jr. et al. |
| 7,254,617 | B2* | 8/2007 | Schuh ............... G06F 17/30902 707/E17.12 |
| 7,289,976 | B2 | 10/2007 | Kihneman et al. |
| 7,340,411 | B2 | 3/2008 | Cook |
| 7,356,482 | B2 | 4/2008 | Frankland et al. |
| 7,401,094 | B1 | 7/2008 | Kesler |
| 7,412,455 | B2 | 8/2008 | Dillon |
| 7,508,789 | B2 | 3/2009 | Chan |
| 7,620,655 | B2 | 11/2009 | Larsson et al. |
| 7,698,160 | B2 | 4/2010 | Beaven et al. |
| 7,779,039 | B2 | 8/2010 | Weissman et al. |
| 7,818,454 | B2* | 10/2010 | Kim ................ H04L 29/12066 709/214 |
| 7,917,617 | B1* | 3/2011 | Ponnapur ............ G06F 9/455 709/224 |
| 8,015,495 | B2 | 9/2011 | Achacoso et al. |
| 8,082,301 | B2 | 12/2011 | Ahlgren et al. |
| 8,095,413 | B1 | 1/2012 | Beaven |
| 8,095,594 | B2 | 1/2012 | Beaven et al. |
| 8,275,836 | B2 | 9/2012 | Beaven et al. |
| 8,346,874 | B2* | 1/2013 | Alarid ................ G06Q 10/107 709/206 |
| 8,457,545 | B2 | 6/2013 | Chan |
| 8,484,111 | B2 | 7/2013 | Frankland et al. |
| 2001/0044791 | A1 | 11/2001 | Richter et al. |
| 2002/0022986 | A1 | 2/2002 | Coker et al. |
| 2002/0029161 | A1 | 3/2002 | Brodersen et al. |
| 2002/0029376 | A1 | 3/2002 | Ambrose et al. |
| 2002/0035577 | A1 | 3/2002 | Brodersen et al. |
| 2002/0042264 | A1 | 4/2002 | Kim |
| 2002/0042843 | A1 | 4/2002 | Diec |
| 2002/0072951 | A1 | 6/2002 | Lee et al. |
| 2002/0082892 | A1 | 6/2002 | Raffel et al. |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0162090 | A1 | 10/2002 | Parnell et al. |
| 2002/0165742 | A1 | 11/2002 | Robins |
| 2003/0004971 | A1 | 1/2003 | Gong et al. |
| 2003/0018705 | A1 | 1/2003 | Chen et al. |
| 2003/0018830 | A1 | 1/2003 | Chen et al. |
| 2003/0066031 | A1 | 4/2003 | Laane |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0164986 | A1* | 9/2003 | Boire-Lavigne .... H04L 12/5835 358/400 |
| 2003/0187921 | A1 | 10/2003 | Diec |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2003/0233404 | A1 | 12/2003 | Hopkins |
| 2004/0001092 | A1 | 1/2004 | Rothwein et al. |
| 2004/0010489 | A1 | 1/2004 | Rio |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan, Jr. et al. |
| 2004/0199489 | A1 | 10/2004 | Barnes-Leon et al. |
| 2004/0199536 | A1 | 10/2004 | Barnes Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0065925 | A1 | 3/2005 | Weissman et al. |
| 2005/0091098 | A1 | 4/2005 | Brodersen et al. |
| 2005/0097521 | A1* | 5/2005 | Liu .................. G06F 9/541 717/136 |
| 2005/0223022 | A1 | 10/2005 | Weissman et al. |
| 2005/0283478 | A1 | 12/2005 | Choi et al. |
| 2006/0021019 | A1 | 1/2006 | Hinton et al. |
| 2006/0059228 | A1* | 3/2006 | Kasamsetty .......... G06F 9/5088 709/203 |
| 2006/0206834 | A1 | 9/2006 | Fisher et al. |
| 2008/0249972 | A1 | 10/2008 | Dillon |
| 2009/0063415 | A1 | 3/2009 | Chatfield et al. |
| 2009/0100342 | A1 | 4/2009 | Jakobson |
| 2009/0177744 | A1 | 7/2009 | Marlow et al. |
| 2010/0017515 | A1* | 1/2010 | Nishiguchi ............ G06F 9/5077 709/226 |
| 2010/0115008 | A1* | 5/2010 | Nakatani ............... G06F 17/302 707/823 |
| 2011/0218958 | A1 | 9/2011 | Warshavsky et al. |
| 2011/0247051 | A1 | 10/2011 | Bulumulla et al. |
| 2012/0042218 | A1 | 2/2012 | Cinarkaya et al. |
| 2013/0218948 | A1 | 8/2013 | Jakobson |
| 2013/0218949 | A1 | 8/2013 | Jakobson |
| 2013/0218966 | A1 | 8/2013 | Jakobson |
| 2013/0247216 | A1 | 9/2013 | Cinarkaya et al. |
| 2014/0359537 | A1 | 12/2014 | Jackobson et al. |
| 2015/0006289 | A1 | 1/2015 | Jakobson et al. |
| 2015/0007050 | A1 | 1/2015 | Jakobson et al. |
| 2015/0095162 | A1 | 4/2015 | Jakobson et al. |

\* cited by examiner

SYSTEM, METHOD AND COMPUTER PROGRAM PRODUCT FOR ROUTING MESSAGES TO A SERVER

CLAIM OF PRIORITY

This application claims the benefit of U.S. Provisional Patent Application 61/327,036, entitled "METHODS AND SYSTEMS FOR AUTOMATICALLY MIGRATING DATA IN AN ON-DEMAND SERVICE ENVIRONMENT," by Vijayanth Devadhar, filed Apr. 22, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to message handling, and more particularly to handling messages utilizing a queue framework.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventional systems may desire to migrate data within the system. For example, in response to one or more occurrences (e.g., demands of a client, efficiency concerns, etc.), data associated with a client may be migrated from one server of the system to another server of the system. Unfortunately, migration techniques have been associated with various limitations.

Just by way of example, migrating a client's data within a system may interfere with transient data stored in a messaging element of the system that is associated with the client's migration. Additionally, waiting for such transient data to exit the messaging element of the system may not be possible due to time constraints. Accordingly, it is desirable to effectively manage transient data associated with the migration of a client.

BRIEF SUMMARY

In accordance with embodiments, there are provided mechanisms and methods for routing messages to a server. These mechanisms and methods for routing messages to a server can enable dynamic data migration within a system, increased efficiency, improved user experience, avoidance of data loss, etc.

In an embodiment and by way of example, a method for routing messages to a server is provided. In one embodiment, a migration operation is detected, the migration operation including migration of data from a first server of a system to a second server of the system. Additionally, one or more messages associated with the data are delayed within a messaging element of the system during the migration operation. Further, a conclusion of the migration operation is detected. Further still, the one or more messages within the messaging element are conditionally routed to the second server of the system.

While one or more implementations and techniques are described with reference to an embodiment in which routing messages to a server is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for routing messages to a server.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for routing messages to a server will be described with reference to example embodiments.

Figure 1:
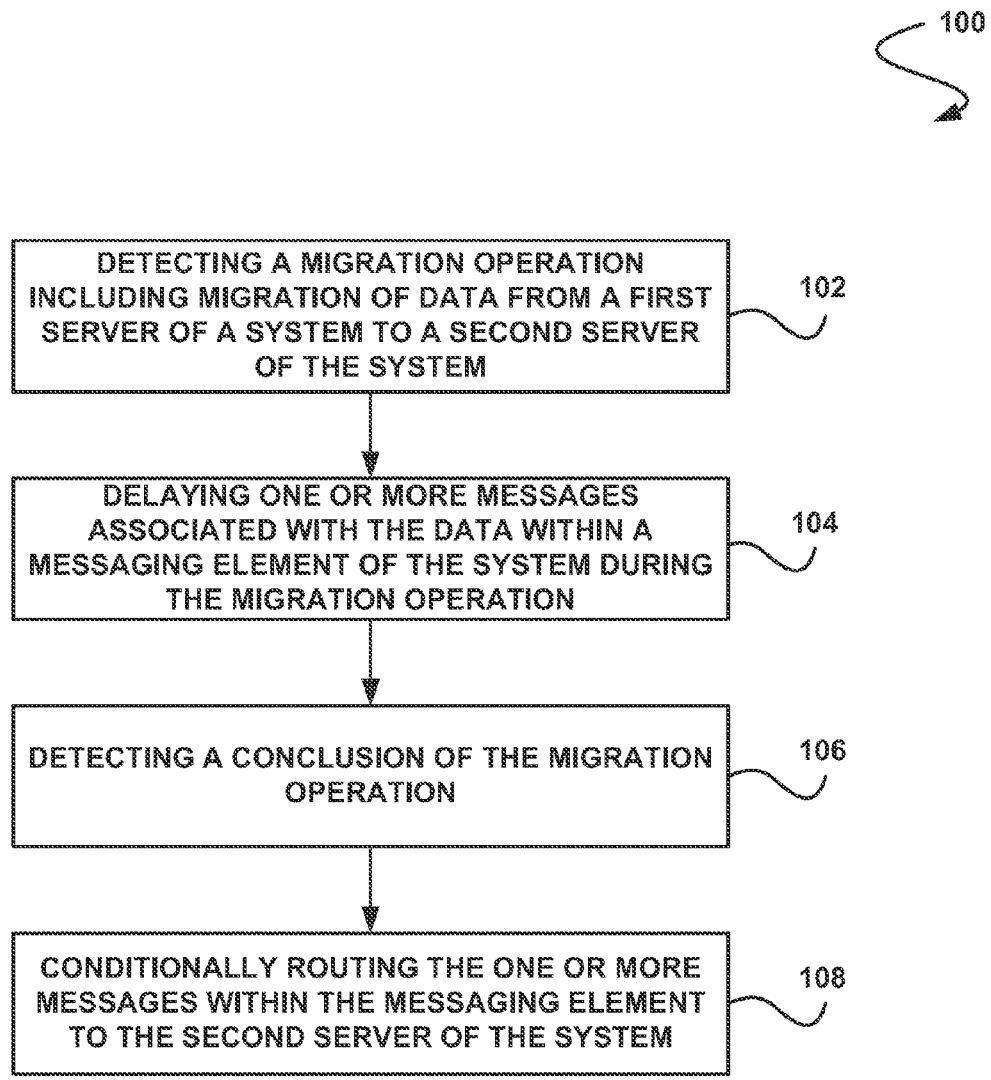
FIG. 1 illustrates a method for routing messages to a server, in accordance with one embodiment.

FIG. 1 illustrates a method 100 for routing messages to a server, in accordance with one embodiment. As shown in operation 102, a migration operation is detected, the migration operation including migration of data from a first server of a system to a second server of the system. In one embodiment, the data may be associated with a client (e.g., an organization, etc.) of the system. For example, the migration of data may include the migration of an organization of the system from the first server to the second server. In another embodiment, the system may include a multi-tenant on-demand database system, etc.

Additionally, in one embodiment, the migration of data may include transferring and/or copying data from the first server to the second server. For example, the data may be located at the first server of the system, and may be transferred to the second server of the system. In another embodiment, the data that is migrated may include persistent data. For example, the data may include employee data, revenue data, order data, etc. In yet another embodiment, the migration of data may be performed in response to a request by a client of the system. In still another embodiment, the migration of data may be performed automatically in response to one or more needs of the system.

Further, in one embodiment, the servers of the system may include one or more databases. For example, the migration operation may include the migration of the data from one or more databases of the first server to one or more databases of the second server. In another embodiment, the servers may include one or more of hardware and software. In yet another embodiment, the servers may each include one or more pods. In still another embodiment, the migration operation may be detected by an element of the system. For example, the migration operation may be detected by a messaging element of the system, a monitoring element of the system, etc.

Further still, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Also, as shown in operation 104, one or more messages associated with the data are delayed within a messaging element of the system during the migration operation. In one embodiment, the messaging element may include a message queue of the system. In another embodiment, the messages may be associated with the client of the system. In another embodiment, the messages associated with the data may include transient data. For example, the messages may include requests to perform one or more tasks within the system. In another example, the messages associated with the data may include tasks to be performed within an organization of the system, background tasks associated with the organization of the system, etc.

Additionally, in one embodiment, delaying the one or more messages may include re-enqueuing the messages within the messaging element of the system. For example, the one or more messages may be taken out of a message queue of the system and placed back into the message queue of the system.

In another embodiment, the re-enqueuing may be performed with a delay. For example, the messages may be placed back into the message queue of the system with a time delay.

Further, in one embodiment, a state associated with the data of the system may be changed to reflect that the migration operation is currently being performed within the system. In still another embodiment, the messaging element of the system may continue to run (e.g., may not be shut down, etc.) during the migration operation. In this way, no messages associated with the data being migrated may be processed during the migration of the data.

Further still, as shown in operation 106, a conclusion of the migration operation is detected. In one embodiment, a notification of the conclusion of the migration may be sent to the messaging element of the system. In another embodiment, the notification of the conclusion of the migration may include an indication as to whether the migration operation was successful or unsuccessful. For example, the notification of the conclusion of the migration may include an indication as to whether the data is currently located on the first server or the second server of the system.

Also, in one embodiment, the results of the migration operation may be confirmed by a user. For example, the client, customer, etc. whose data is being migrated may accept or refuse (e.g., roll back, etc.) the results of the migration operation. In another embodiment, the confirmation of the results of the migration operation may be sent to the messaging element of the system along with the notification of the conclusion of the migration. In yet another embodiment, a state associated with the data may be changed to reflect that the migration operation was successful and that the data is now on the second server of the system.

In addition, as shown in operation 108, the one or more messages within the messaging element are conditionally routed to the second server of the system. In one embodiment, if the messaging element confirms that the migration operation was successful, then the messages within the messaging element may be routed to the second server of the system. For example, messages within the messaging element that are directed toward the data at the first server may be redirected toward the second server, since the data is now at the second server.

Furthermore, in one embodiment, if the messaging element confirms that the migration operation was not successful, then the messages within the messaging element may be routed to the first server of the system. For example, messages within the messaging element that are directed toward the data at the first server may remain directed toward the first server, since the data migration to the second server failed and the data may remain at the first server.

Further still, in one embodiment, if the migration is successful, new messages entering the messaging element that are directed toward the migrated data may be routed to the second server. For example, new messages relating to the migrated data that are directed toward the first server may be enqueued in the messaging element and may be may be redirected toward the second server, since the data is now at the second server.

In this way, automatic migration may be performed for messages within the messaging element during the migration of the data. Additionally, the messages associated with the data may follow the data as the data is migrated to different servers throughout the system.

Figure 2:
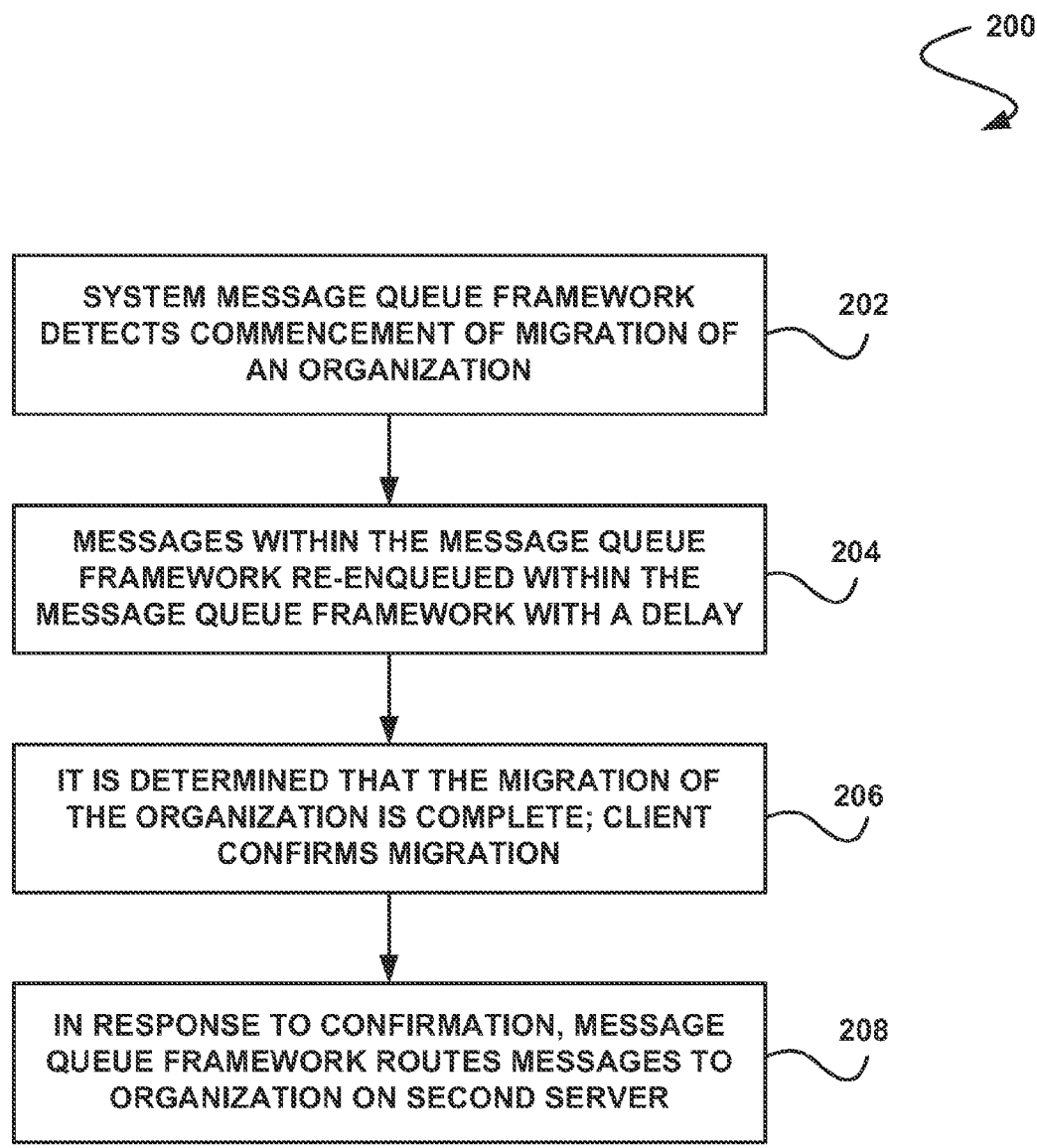
FIG. 2 illustrates method for managing organization messages during and after a migration of the organization, in accordance with another embodiment.

FIG. 2 illustrates a method 200 for managing organization messages during and after a migration of the organization, in accordance with another embodiment. As an option, the method 200 may be carried out in the context of the functionality of FIG. 1. Of course, however, the method 200 may be carried out in any desired environment. The aforementioned definitions may apply during the present description.

As shown in operation 202, a system message queue framework detects the commencement of a migration of an organization from a first server (e.g., a source server, etc.) of the system to a second server (e.g., a target server, etc.) of the system. In one embodiment, the migration may be performed in response to an increase in the size of the organization. In another embodiment, the migration may be performed in response to a change in physical location of a client that manages the organization. In yet another embodiment, the migration may be performed in response to a limited amount of resources (e.g., processor resources, storage resources, etc.) within the first server. Of course, however, the migration may be performed in response to any criteria.

Additionally, as shown in operation 204, messages within the message queue framework that are identified as being associated with the migrating organization (e.g., that perform an action within the organization, manipulate data of the organization, etc.) are re-enqueued within the message queue framework with a delay. In one embodiment, the messages may have been left on the queue when the organization is being migrated. In this way, the messages associated with the migrating organization may not be executed prematurely during the performance of the migration.

Further, as shown in operation 206, it is determined that the migration of the organization is complete, and a client of the system in charge of the organization confirms the migration. Further still, as shown in operation 208, in response to the confirmation of the migration, the message queue framework routes all re-enqueued messages and all subsequent messages that are associated with the organization to the organization on the second server. In this way, all messages associated with the organization may follow the organization as it migrates to any server in the system. For example, if the organization later is successfully migrated to a third server within the system, the messages associated with the organization may be routed to the third server.

Further still, in one embodiment, the routing of the messages in the message queue framework may be available to all message types within the system. For example, each message type may include an option to enable or disable the routing of that message type in response to the migration of an organization. In another embodiment, if during the migration of the organization from the first server to the second server, the second server becomes unreachable (e.g., a network connection between the first and second server fails during migration, etc.), the message queue framework may detect this occurrence and may store the messages within the message queue until the migration has completed or is cancelled. In this way, loss of messages within the message queue may be avoided.

Also, in one embodiment, when a message associated with the organization is routed to the server on which the organization has successfully migrated, and such message is successfully performed on the server (e.g., by a handler, etc.), the server may return a confirmation of such performance to the message queue framework. However, if the confirmation is not received at the message queue framework (e.g., due to a lost network connection, etc.), and the message queue framework subsequently routes a duplicate message to the server, such duplicate message may be detected by a handling mechanism at the server and may be flagged as a duplicate. In this way, duplicate message processing may be avoided.

Additionally, in one exemplary embodiment, when the message queue framework dequeues a message, it may look up the organization information of the message. If the organization information could not be located, unless the message type tells the framework to discard the message, the message may be processed on the source instance within the system. In another embodiment, if the organization information is found, then the organization status may be retrieved. If the organization status notes that the migration has successfully completed (e.g., is marked as MIGRATED, etc.), then one or more additional actions may be performed. However, if the organization status notes that the migration has not successfully completed, the message may be processed on the current instance within the system.

Further, in one exemplary embodiment, if the organization status notes that the migration has successfully completed, then a message handler of the system may be asked what sorts of processing the messages for migrated organizations need. In another embodiment, if the message handler responds with an indication that normal processing is needed, then the organization's server pool may be examined. In yet another embodiment, if the server pool is different from the current application server's server pool, then the message may be posted to a servlet at the target server pool. In another embodiment, in cases including the failure to post the message using the servlet, the message may be re-enqueued on to the local message queue with a delay of 30 minutes, and after the 30 minute delay the message may show up for processing again and same sequence of steps may take place.

Further still, in one embodiment, if the message handler responds with an indication that processing is needed on the dequeueing instance, then an attempt to process the messages on such instance may be made. In another embodiment, any failures that may occur due to an organization's status may be the responsibility of the handler's. In yet another embodiment, if the message handler responds with an indication to discard the instance, the message may be discarded without processing.

In this way, messages within the message queue framework may be processed only once. Additionally, in one embodiment, after a successful organization migration, messages that were enqueued on the first server prior to the migration, but not processed when the migration started, may be processed on the second server. Further, in another embodiment, after a failed organization migration, messages that were enqueued on the first server prior to migration, but were not processed yet when the migration started, may be processed on the first server.

Also, in one embodiment, message processing for other organizations within one or more of the first and second servers of the system may not be stopped during the migration of the organization. In another embodiment, all of the messages within the message queue framework may maintain their relative order during the migration. In yet another embodiment, for each message in the message queue framework, elements such as content, priority, and other properties may be cloned from the first server to the second server. In still another embodiment, one or more message types of the messages within the message queue framework may opt out of the routing of the messages. For example, one or more message types may note that such message types are to be processed locally (e.g., at the first server, etc.) only, that such message types are to be discarded instead of routed, etc.

System Overview

Figure 3:
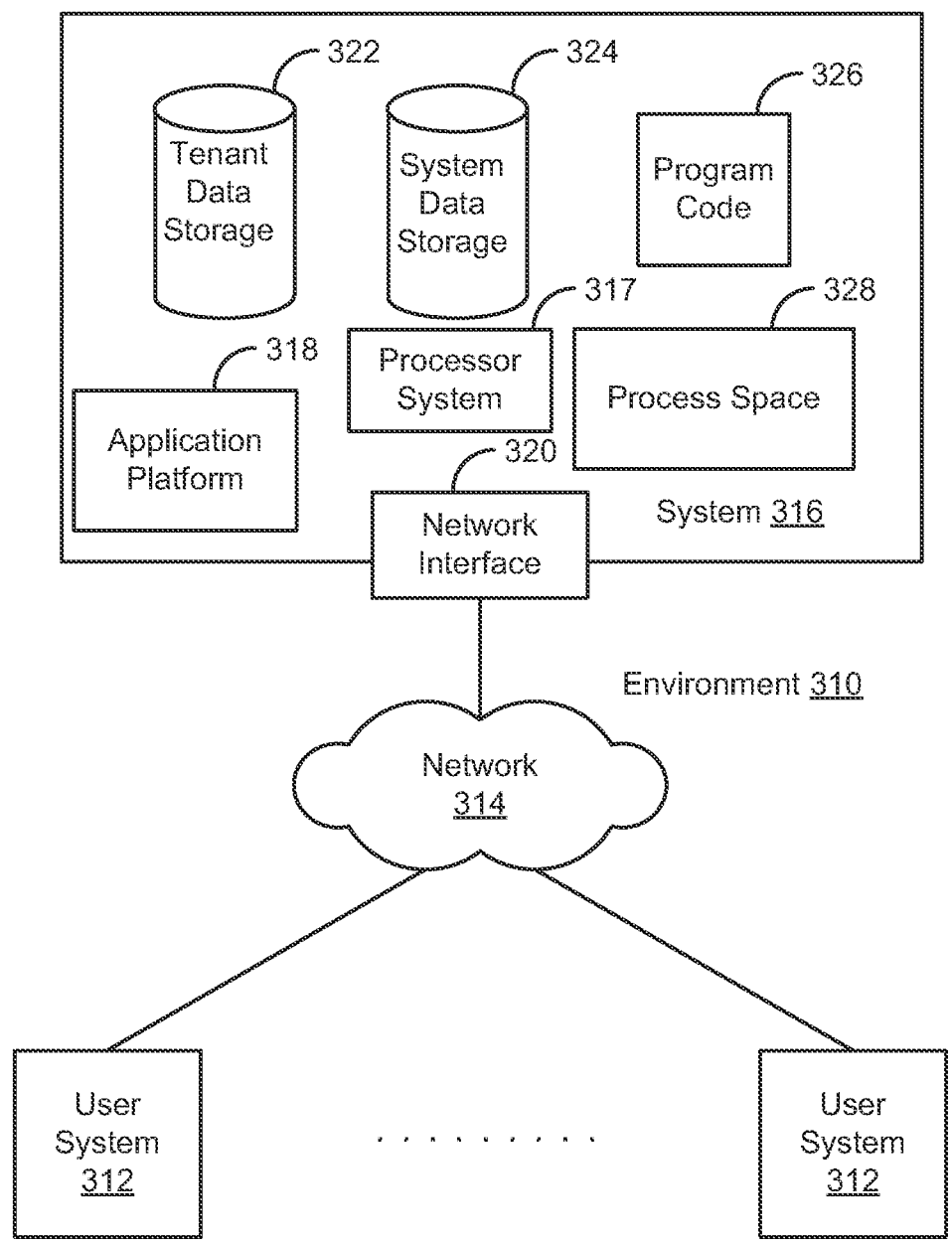
FIG. 3 illustrates a block diagram of an example of an environment wherein an on-demand database system might be used.

FIG. 3 illustrates a block diagram of an environment 310 wherein an on-demand database system might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database system exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database system, which is system 316.

An on-demand database system, such as system 316, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database system 316 may include an application platform 318 that enables creation, managing and executing one or more applications developed by the provider of the on-demand database system, users accessing the on-demand database system via user systems 312, or third party application developers accessing the on-demand database system via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, web pages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an NITS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
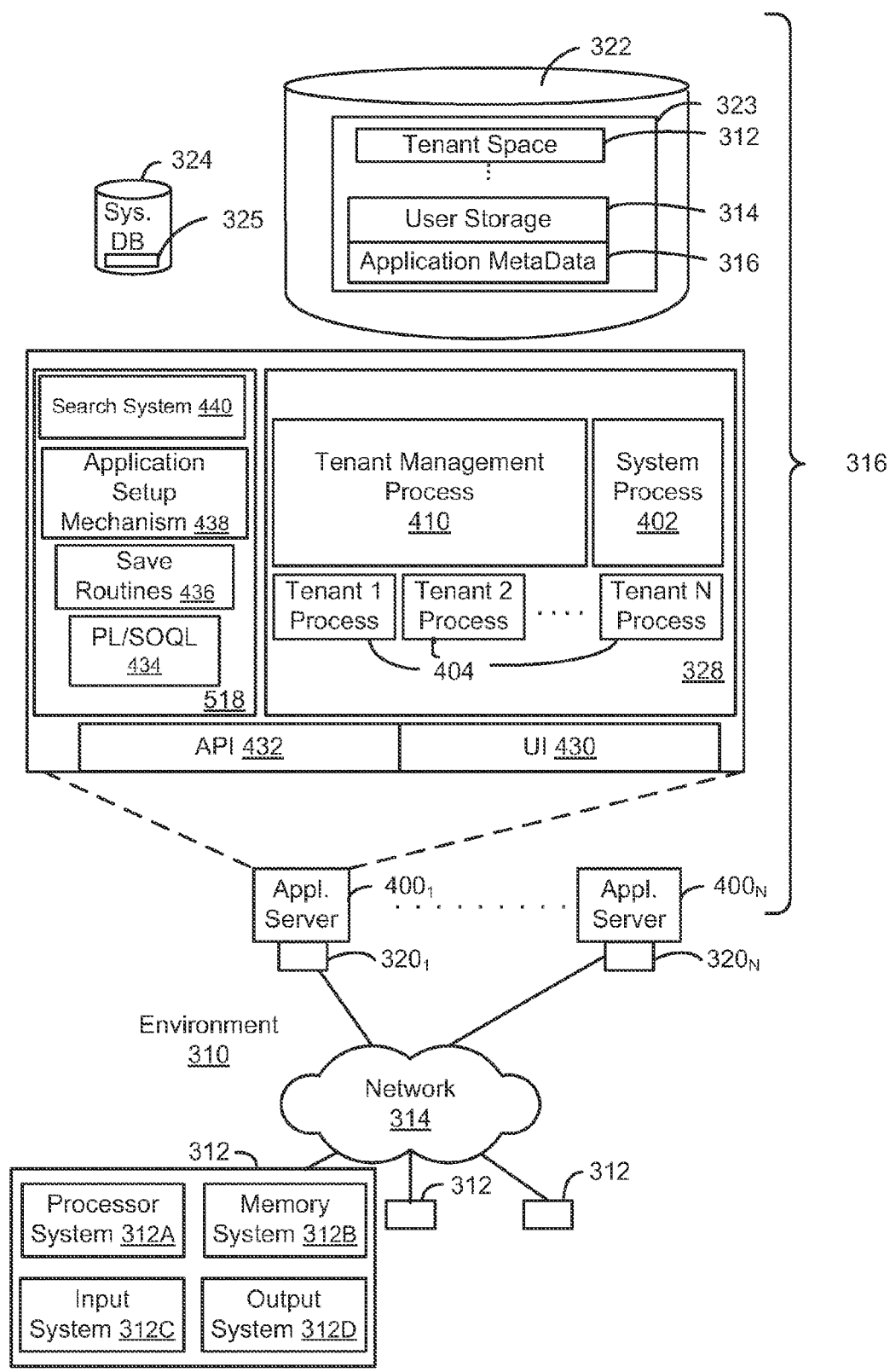
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code adapted to be executed by a computer to implement a method for routing messages to a server, the method comprising:
   detecting by a system a request to migrate data of a client of the system from a first server of the system to a second server of the system;
   in response to the request, migrating the data of the client from the first server of the system to the second server of the system;
   during the migrating:
      accessing one or more messages within a messaging element of the system separate from the first server and the second server, the one or more messages including requests to perform one or more tasks on one or more servers of the system;
      identifying one or more of the messages queued within the messaging element of the system that include one or more tasks to be performed in association with the client of the system whose data is being migrated;
      re-enqueueing the one or more identified messages within the messaging element of the system with a predetermined time delay;
   detecting a conclusion to the migrating of the data of the client from the first server to the second server;
   routing the one or more messages determined to be associated with the data being migrated from the messaging element to the second server and performing the one or more tasks requested by the one or more messages on the second server, when it is determined that the migrating of the data was successful; and
   routing the one or more messages determined to be associated with the data being migrated from the messaging element to the first server and performing the one or more tasks requested by the one or more messages on the first server, when it is determined that the migrating of the data was not successful.

2. The computer program product of claim 1, wherein the migrating of the data includes migrating an organization of the system from the first server to the second server.

3. The computer program product of claim 1, wherein the messaging element includes a message queue of the system.

4. The computer program product of claim 3, further including receiving, at the message queue, an indication from the second server confirming whether each of the one or more messages routed to the second server has been performed on the second server of the system.

5. The computer program product of claim 1, wherein the one or more messages associated with the data include transient data.

6. The computer program product of claim 1, wherein a state associated with the data of the client of the system is changed to reflect that the migrating is currently being performed within the system.

7. The computer program product of claim 1, wherein a notification of the conclusion to the migrating includes an indication as to whether the migrating was successful or unsuccessful.

8. The computer program product of claim 1, wherein a result of the migrating is confirmed by a user.

9. The computer program product of claim 1, wherein a state associated with the data is changed to reflect that the migrating was successful and that the data is now on the second server of the system.

10. The computer program product of claim 1, wherein if the migrating is successful, new messages entering the messaging element that are directed toward the migrated data are routed to the second server.

11. The computer program product of claim 10, wherein the new messages, when received at the messaging element, are initially directed toward the first server, and are enqueued in the messaging element before being re-directed and routed toward the second server.

12. The computer program product of claim 1, wherein the system includes a multi-tenant on-demand database system.

13. The computer program product of claim 1, wherein the data that is migrated includes persistent data.

14. The computer program product of claim 1, wherein the migrating of the data is performed in response to a request by the client of the system.

15. The computer program product of claim 1, wherein the migrating of the data is performed automatically in response to one or more needs of the system.

16. The computer program product of claim 1, wherein routing for each type of the one or more messages is configured to be enabled or disabled, such that the routing of each of the one or more messages within the messaging element to the second server of the system is further based on a type of each of the one or more messages.

17. The computer program product of claim 1, wherein it is determined that one or more of the messages queued within the messaging element of the system are associated with the data being migrated from the first server to the second server when it is determined that the one or more messages manipulate the data being migrated from the first server to the second server.

18. A method, comprising:
   detecting by a system a request to migrate data of a client of the system from a first server of the system to a second server of the system;
   in response to the request, migrating the data of the client from the first server of the system to the second server of the system;
   during the migrating:
      accessing one or more messages within a messaging element of the system separate from the first server and the second server, the one or more messages including requests to perform one or more tasks on one or more servers of the system;
      identifying one or more of the messages queued within the messaging element of the system that include one or more tasks to be performed in association with the client of the system whose data is being migrated;

re-enqueueing the one or more identified messages within the messaging element of the system with a predetermined time delay;

detecting a conclusion to the migrating of the data of the client from the first server to the second server;

routing the one or more messages determined to be associated with the data being migrated from the messaging element to the second server and performing the one or more tasks requested by the one or more messages on the second server, when it is determined that the migrating of the data was successful; and routing the one or more messages determined to be associated with the data being migrated from the messaging element to the first server and performing the one or more tasks requested by the one or more messages on the first server, when it is determined that the migrating of the data was not successful.

19. A system, comprising:

at least one processor for:

detecting by the system a request to migrate data of a client of the system from a first server of the system to a second server of the system;

in response to the request, migrating the data of the client from the first server of the system to the second server of the system;

during the migrating:

accessing one or more messages within a messaging element of the system separate from the first server and the second server, the one or more messages including requests to perform one or more tasks on one or more servers of the system;

identifying one or more of the messages queued within the messaging element of the system that include one or more tasks to be performed in association with the client of the system whose data is being migrated;

re-enqueueing the one or more identified messages within the messaging element of the system with a predetermined time delay;

detecting a conclusion to the migrating of the data of the client from the first server to the second server;

routing the one or more messages determined to be associated with the data being migrated from the messaging element to the second server and performing the one or more tasks requested by the one or more messages on the second server, when it is determined that the migrating of the data was successful; and routing the one or more messages determined to be associated with the data being migrated from the messaging element to the first server and performing the one or more tasks requested by the one or more messages on the first server, when it is determined that the migrating of the data was not successful.

\* \* \* \* \*